United States Patent [19]

Fasig et al.

[11] Patent Number: 5,454,080

[45] Date of Patent: Sep. 26, 1995

[54] REMOVABLE HARD DISK DRIVE SYSTEM WITH CIRCUIT FOR HOT INSERTION AND REMOVAL RESPONSIVE TO CONTACTS OF ZERO-INSERTION-FORCE CONNECTOR ON THE LATERAL SIDE OF THE DRIVE

[75] Inventors: Jonathan L. Fasig; Thomas R. Fournier; Kevin P. O'Marro, all of Rochester, Minn.

[73] Assignee: International Business Machines Corporation, Armonk, N.Y.

[21] Appl. No.: 834,072

[22] Filed: Feb. 10, 1992

[51] Int. Cl.$^6$ .............................. G06F 3/00; G06F 1/00; G06F 1/16

[52] U.S. Cl. .................... 395/283; 361/685; 361/684; 361/683; 364/236.2; 364/248.1; 364/280.1; 364/280.2; 364/DIG. 1; 364/927.83; 364/DIG. 2; 395/894

[58] Field of Search ................ 395/275; 360/900, 360/903, 99.06; 361/685; 439/285, 297

[56] References Cited

U.S. PATENT DOCUMENTS

| 4,352,492 | 10/1982 | Smith | 273/1 |
|---|---|---|---|
| 4,532,564 | 7/1985 | Larson et al. | 360/97 |
| 4,658,944 | 4/1987 | Kogure et al. | 192/84 PM |
| 4,717,982 | 1/1988 | Toreson et al. | 260/137 |
| 4,731,698 | 3/1988 | Millot et al. | 361/386 |
| 4,893,210 | 1/1990 | Mintzlaff | 360/137 |
| 4,937,806 | 6/1990 | Babson et al. | 369/75.1 |
| 4,956,733 | 9/1990 | Dalziel | 360/105 |
| 4,965,685 | 10/1990 | Thompson et al. | 360/97.01 |
| 4,965,691 | 10/1990 | Iftikar et al. | 360/133 |
| 4,982,303 | 1/1991 | Krenz | 360/137 |
| 5,016,121 | 5/1991 | Peddle et al. | 360/39 |
| 5,041,924 | 8/1991 | Blackborow et al. | 360/69 |
| 5,045,960 | 9/1991 | Eding | 360/97.01 |
| 5,126,890 | 6/1992 | Wade et al. | 360/60 |
| 5,297,067 | 3/1994 | Blackborrow et al. | 364/708.1 |
| 5,305,180 | 4/1994 | Mitchell et al. | 361/685 |

FOREIGN PATENT DOCUMENTS

| 0378282 | 7/1990 | European Pat. Off. . |
|---|---|---|
| 59-116961 | 7/1984 | Japan . |
| 2053125 | 2/1990 | Japan . |
| 283883 | 3/1990 | Japan . |
| 4097498 | 3/1992 | Japan . |

OTHER PUBLICATIONS

IBM Technical Disclosure Bulletin, vol. 32, No. 10B, Mar. 1990, pp. 300–304, entitled "Pluggable Hard Disk File Assembly".

Methium "Drives Prove Ideal for Removable Storage", PC Week Sep. 30, 1991 vol. 8 No. 39 p. 87(3).

*Primary Examiner*—Thomas C. Lee
*Assistant Examiner*—D. Dinh
*Attorney, Agent, or Firm*—Richard E. Billion; Shawn B. Dempster

[57] ABSTRACT

A computer system having a removable hard disk drive is disclosed. The interposer card is modified to receive a docking bay which receives a cartridge which contains a hard disk drive. The docking bay includes the male portion of a zero insertion force connector and a first circuit board to which connects to the interposer card of the computer. The first circuit board also includes circuit paths between the male portion of the zero insertion force connector and the end which connects to the interposer card of the computer. The first circuit card also includes circuitry which allows "hot plugging" of the hard disk drive to the bus of the computer and which also acts as a lockout to prevent writing to the removable hard disk drive until after the computer system has been rebooted. The docking bay also includes a spring mechanism for ejecting the cartridge. A finger lever holds the cartridge in place and can be lifted to eject the cartridge. A hard disk drive is placed within a cartridge which includes a second printed circuit board. Attached to the second printed circuit board is the female portion of a zero insertion force connector.

15 Claims, 7 Drawing Sheets

REMOVABLE HARD DISK DRIVE SYSTEM WITH CIRCUIT FOR HOT INSERTION AND REMOVAL RESPONSIVE TO CONTACTS OF ZERO-INSERTION-FORCE CONNECTOR ON THE LATERAL SIDE OF THE DRIVE

BACKGROUND OF THE INVENTION

With the advent of the computer there has been a need for storing vast amounts of data. Several devices have been used to accomplish this task. One of these devices is a hard disk drive. A hard disk drive includes one or more disks mounted on a spindle for rotation. Data is typically stored in concentric tracks which are like rings on a tree. A transducer is passed over the surface of the disk or disks and data is read from the surface of the disk or written to the surface of the disks. Hard disk drives are used in all types of computers ranging from the largest supercomputer to many of the personal computers used in homes and offices throughout the world.

The disks within a hard disk drive are permanently mounted to the spindle. In addition, the environment within the housing of a disk drive is carefully controlled to prevent contaminants since particles the size of smoke from a cigarette can "trip" the transducer and cause it to contact the disk which results in a disk crash or undesirable loss of data. As a result, the individual disks from a disk drive are not replaced by the user of the computer. Since physical access to the hard disk drive is typically not needed most computers are physically configured so that the hard disk drive is placed within the computer where it is not seen by the user. In most computers the hard disk drive is attached to the data bus within the computer and is not removed until the hard disk drive is replaced.

Of course, there are always exceptions to such common configurations. In some instances, where particularly sensitive information is being stored on a hard disk drive, computer user's prefer to have an entire hard disk drive they can remove from the computer and lock within a safe when not being used. This prevents computer hackers from breaking codes and accessing the information on the hard disk drive since there is no way for a hacker to electronically access the information on the hard disk drive.

In the past, there have been removable hard disk drives and removable cartridges of hard disks. Disk cartridges, in which only the disks are removable, have shortcomings. U.S. Pat. No. 4,717,981 issued to Nigam et al. shows such a disk cartridge which has an automatically activated door. U.S. Pat. No. 4,870,518 shows the bay into which the cartridge from U.S. Pat. No. 4,717,981 is inserted. The disk cartridges are more susceptible to contamination since the cartridge is inserted into a port in the computer. The contaminated air must be cleaned by filtration or otherwise before the access door to the disk drive can be opened and the actuator arm which carries the read and write transducer heads can be inserted for reading and writing. Another shortcoming is that cartridge must be precisely aligned mechanically each time the cartridge is inserted into the bay to prevent misreads and so that the disk spins on a level plane. Mechanical alignment using clutching mechanisms and centering mechanisms is not as precise as a fixed hard disk drive in which mechanical alignment is permanently set at manufacture. Such alignment is becoming more critical as the track density on the disk drives increases. Currently, track densities of over 1000 tracks per inch are being used. At some point, the track densities in a cartridge will be unable to keep up with the track densities in a hard disk drive.

The removable hard disk drives of the past have also had shortcomings. Most of the removable hard disk drives have made electrical contact with the computer system using the pins or connectors on the disk drive. U.S. Pat. No. 5,010,426 issued to Krenz is an example of such a drive. The pins associated with connector 30 are engaged with the openings in connector 28. In U.S. Pat. No. 4,633,350 issued to Hanson, the pins 37 are moved into a mating connector by the camming motion after the disk drive is rotated into position. U.S. Pat. No. 4,833,554 issued to Dalziel et al. shows yet another example of pins aligned and slid into engagement with a mating connector. In the Dalziel et al. patent a pair of alignment pins are used. Among the shortcomings associated with each of these methods is the fact that the means for making the connection has a very limited life. For example, the number of cycles that such connections have would at best be approximately 500 cycles. In other words, in an environment where a user would be removing the drive on a daily basis, these drives would last around two years and then would "fail". The "failure" would actually be a failure of the connectors rather than a failing of the hard disk drive itself. Another shortcoming is that these removable disk drives are not easy to remove. The disk drive must be gripped and pulled to break the electrical contacts unlike a floppy disk which is ejected a short distance so that the operator can easily grip the floppy.

U.S. Pat. No. 4,893,210 issued to Mintzlaff is a hard disk drive assembly which can be attached and removed from a power supply to form a stand alone unit external to a computer. The Mintzlaff patent uses a zero insertion force type connector that acts or impinges directly onto the pins of the hard disk drive which carry the inputs to and outputs from the disk drive. The pins would be very susceptible to damage with this arrangement since the elements 42a and 42b which contact the pins of the hard disk drive must be nearly perfect aligned to prevent side loading. Even if the elements 42a and 42b are perfectly aligned, some bending of the pins of the hard disk drive is likely to occur since the pins in the hard disk drives generally stand unsupported. Elements 42a and 42b act outwardly and there is no support behind the pins. Thus, the Mintzlaff patent suffers from the same shortcomings with respect to the number of times the disk drive could be removed and attached as do the patents mentioned above. In addition, the Mintzlaff reference is a stand alone unit which does not have to fit within an opening in a computer. A computer case would have to be modified in order to accommodate a crank such as 15 in the Mintzlaff patent.

The arrangements for making electrical connections in the above references appear to be for making the insertion of the disk drives easier and more reliable rather on the first or subsequent times when a hard disk drive required field service. The above arrangements do not appear to be adapted for removal and insertion on a frequent basis, such as one or more times daily.

Yet another problem associated with current removable disk drives is the repeated forces placed on the hard disk drive unit. The hard disk drive units are able to absorb some shocks however they are still somewhat sensitive. If too much force or a force is repeatedly placed on a hard disk drive distortion may result in the housing and result in tracking errors and possible errors in recovering data.

Therefore, a hard disk drive capable of being removed daily or even a number of times per day is needed. Further-more, a hard disk drive that can be removed easily would be advantageous. This requires an electrical connector which can be used over and over and which has a high duty cycle and an ejection mechanism. In addition, a removable hard disk drive which does not have alignment problems and reads and writes reliably is also needed. Further, a removable hard disk drive that can be inserted and removed from the computer with little or no force placed thereon is also desirable.

SUMMARY OF THE INVENTION

A removable hard disk drive system is disclosed. The removable hard disk drive system includes a modified interposer card, a docking bay and a cartridge which fits within the docking bay. The docking bay is within the computer. The docking bay includes the male portion of a zero insertion force connector and a first circuit board to which connects to the interposer card of the computer. The first circuit board also includes circuit paths between the male portion of the zero insertion force connector and the end which connects to the interposer card of the computer. The first circuit card also includes circuitry which allows "hot plugging" of the hard disk drive to the bus of the computer and which also acts as a lockout to prevent writing to the removable hard disk drive until after the computer system has been rebooted. This prevents data loss resulting from write operations to the hard disk drive at areas which were previously unfilled on the previous disk drive.

A hard disk drive is placed within a cartridge which includes a second printed circuit board. Attached to the second printed circuit board is the female portion of a zero insertion force connector. The second printed circuit board also includes a connector which attaches to the pins of the hard disk drive. Circuit paths run between the connector attached to the pins of the hard disk drive and each separate female portion of the zero insertion force connector.

The docking bay replaces either a hard disk drive or a floppy disk drive in the personal computer. The cartridge fits into the docking bay and is aligned along the male portion of the zero insertion force connector. Turning a knob on the outside of the cartridge moves all of the female portions of the zero insertion force connector so that they clamp the male portions. The hard disk drive in the cartridge is of a form factor smaller than that of the disk drive which it replaces.

BRIEF DESCRIPTION OF THE DRAWINGS

For a better understanding of the present invention, please refer to the accompanying drawings in which.

These drawings are not intended as a definition of the invention but are provided solely for the purpose of illustrating the preferred embodiment of the invention described below.

DETAILED DESCRIPTION OF THE PREFERRED EMBODIMENT

Figure 1:
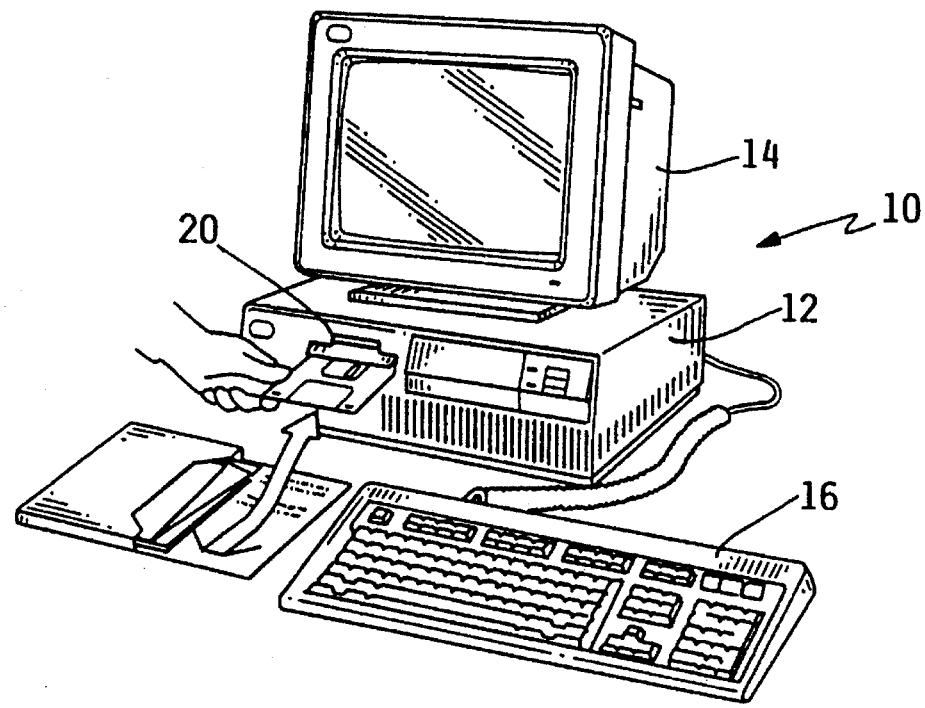
FIG. 1 is a perspective view of a personal computer.

FIG. 1 shows a typical personal computer system 10. The typical personal computer system 10 includes a system unit 12, a monitor 14, and a keyboard 16. The system unit 12 is the heart of the computer system 10 and includes a motherboard which has the main processor thereon. The main processor is the brain of the computer system 10. The system unit 12 also includes a bus which is connected to the various components within the computer system 10. The bus can be analogized to the spinal cord of the computer system. Signals, which include various commands, pass from the main processor along the bus to the various items attached to the bus. Also connected to the bus are various disk drives such as a floppy disk drive 20 and a hard disk drive (not shown in FIG. 1) which is typically housed within the system unit 12. The disk drives act as file cabinets at a human's desk. The main processing unit, like the brain, has only so much room for vital information. Sometimes other information or data is needed to make a decision at which time the file cabinet or disk drive is tapped for the information stored within.

Figure 2:
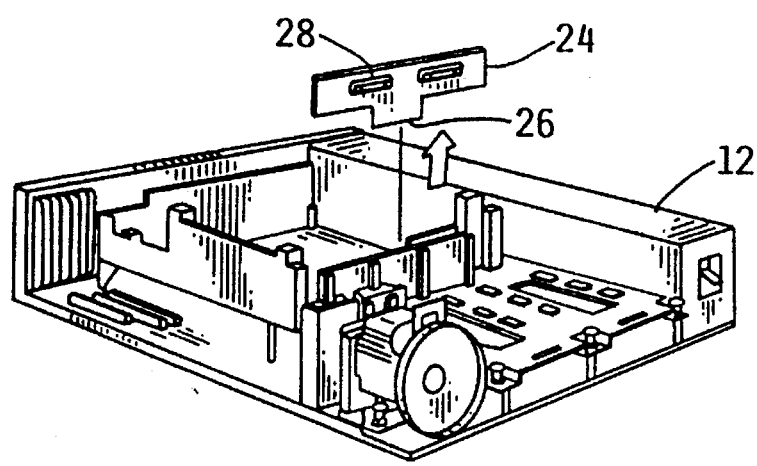
FIG. 2 is a perspective view showing where an interprocessor board fits within a system unit of a personal computer.
Figure 3:
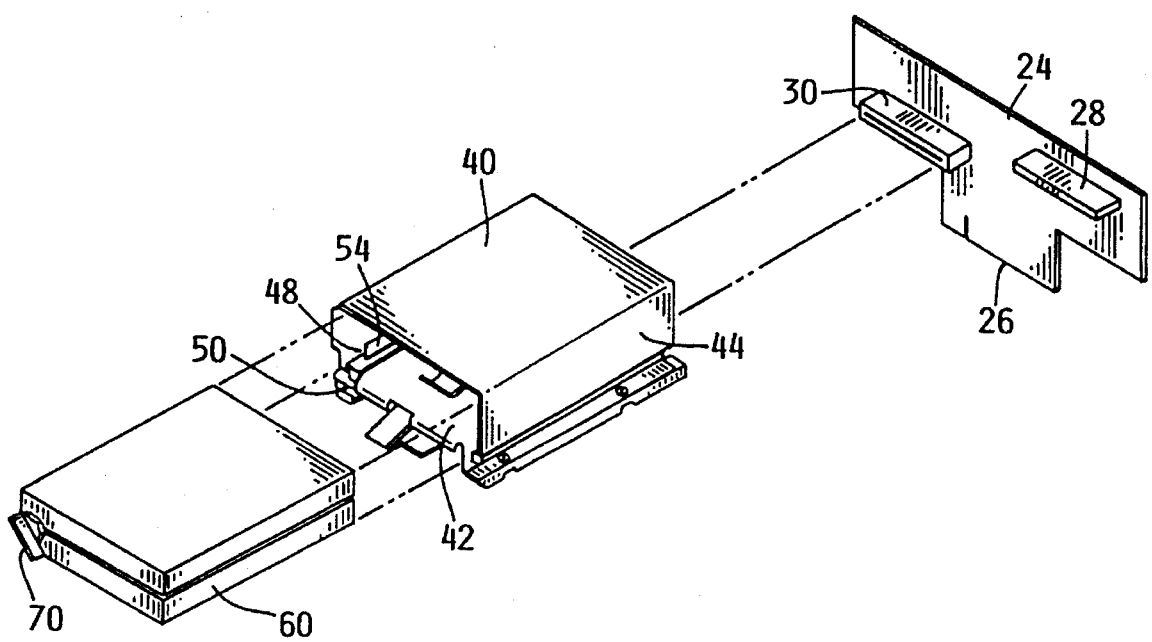
FIG. 3 is a perspective view of the cartridge, docking bay and the interposer card.
Figure 4A:
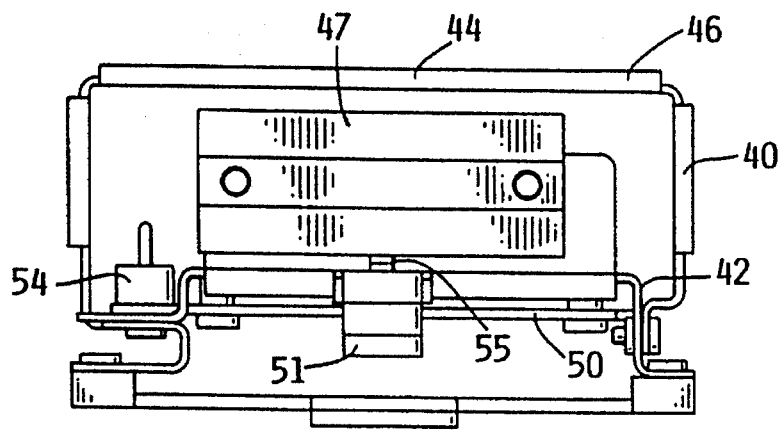
FIG. 4a is a front view of the docking bay.
Figure 4B:
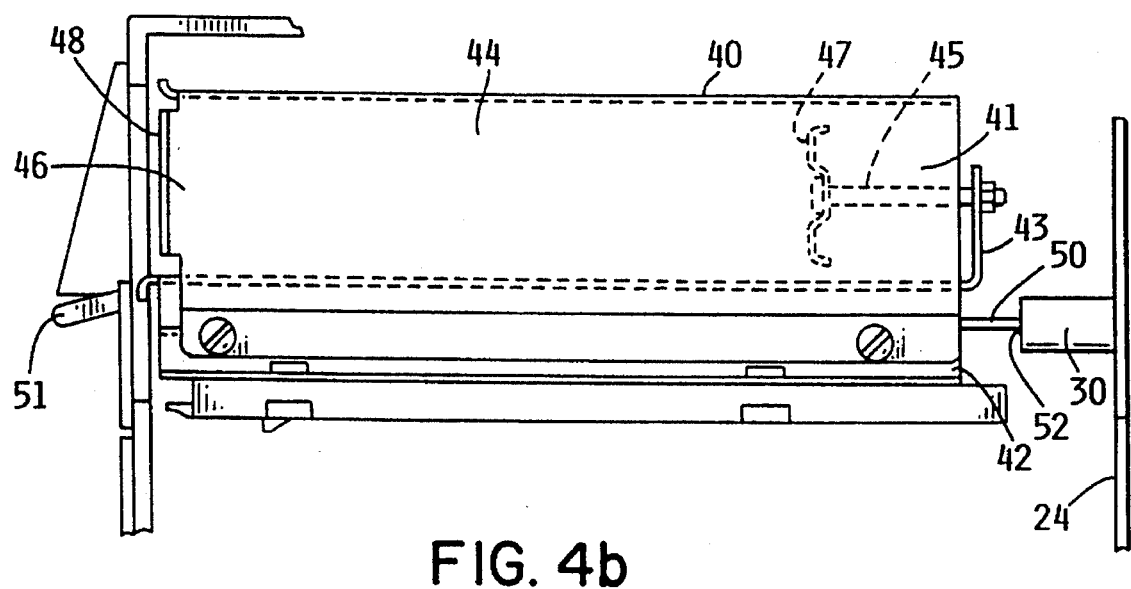
FIG. 4b is a side view of the docking bay.
Figure 5A:
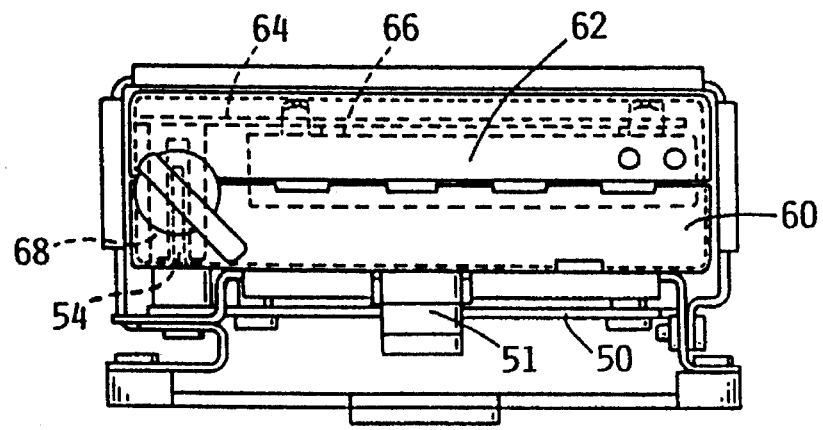
FIG. 5a is a front elevation view of the cartridge in the docking bay.
Figure 5B:
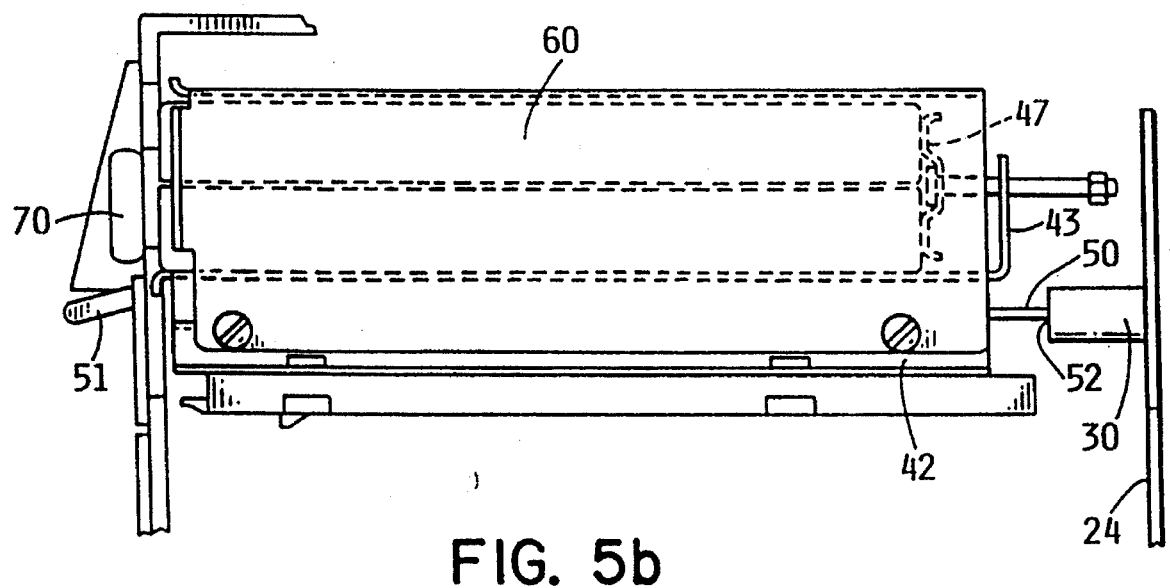
FIG. 5b is a side view of the cartridge in the docking bay.
Figure 6A:
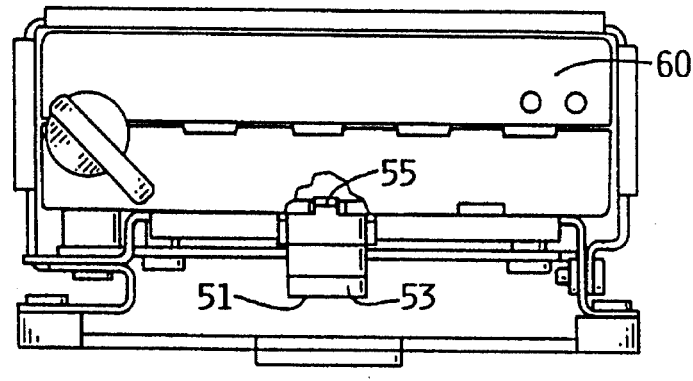
FIG. 6a is a frontal view of the cartridge in the docking bay with a broken away portion detailing the finger latch.
Figure 6B:
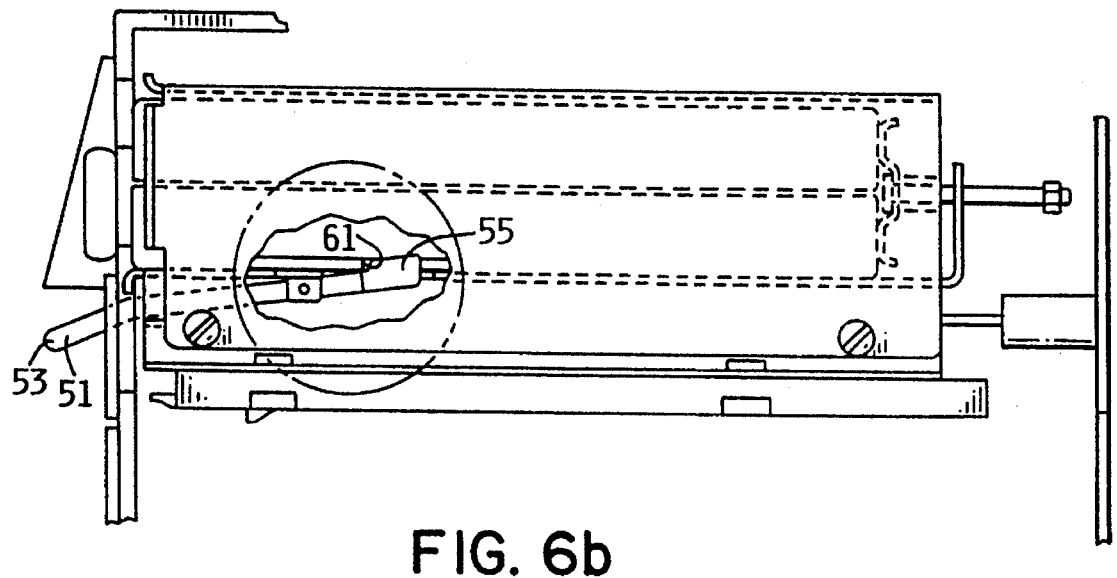
FIG. 6b is a side view of the cartridge in the king bay with a broken away portion detailing the finger latch.
Figure 6C:
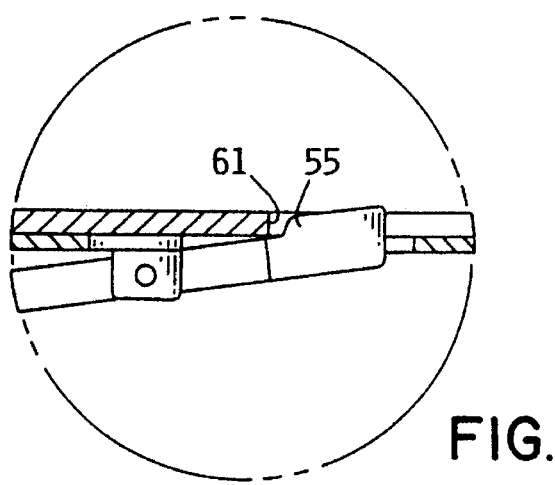
FIG. 6c is a view detailing the finger latch.

Referring now to FIGS. 2 and 3, the removable hard disk drive system is comprised of an interposer board 24 which has been modified, a docking bay 40 which fits within the system unit 12, and a cartridge 60 which fits within the docking bay 40. Each one of these components of the removable hard disk drive system will now be discussed in more detail.

FIG. 2 details the interposer board 24 and shows how the disk drives are connected to the mother board of a system unit 12. The interposer board 24 has an end 26 which connects to the motherboard located in the system unit 12. The interposer board 24 also includes a connector 28 which connects the floppy disk drive 20 to the motherboard. The interposer board also includes a connector 30 for connecting the hard disk drive 22 to the motherboard. It should be noted that all computer systems 10 may not have an interposer board but may have a substitute such as a cable attached to the bus. The interposer board 24 shown in FIG. 2 has been modified so that the connector 30 for the hard disk drive 22 is located toward the front of the system unit 12. In many instances the connector 30 for the hard disk drive 22 is positioned so that the hard disk drive 22 is positioned near the back of the system unit 12 since there is no need for the gaining access to the hard disk drive 22, however, since the invention is a removable hard disk drive the connector 30 is positioned so that the docking bay will face forward.

FIGS. 4a, 4b, 6a, 6b and 6c detail the docking bay 40. The docking bay 40 includes a base 42. Attached to one side of the base is a top 44. The top 44 and the base 42 form a housing 46. The housing 46 of docking bay 40 has an open end 48 which receives the cartridge 60. Opposite the open end 46 is a spring loaded end 41. The spring loaded end 41 includes an upturned portion 43 of the base 42 having two openings which receive a pair of elongated fasteners 45. The fasteners 45 are attached to a spring plate 47 at one end. The other end of the fasteners 45 have a nut attached thereto to keep the fasteners 45 within the two openings in the upturned portion 43. The two fasteners 45 can ride through the two openings in the upturned portion 43. A spring 49 is placed around each of the fasteners 45 and between the upturned end 43 and the plate 47. The springs bias the plate 47 toward the open end 48.

The docking bay 40 also includes a finger lever 51, having an actuator end 53 and a hook end 55. The actuator end 53 is accessible and can be actuated from the front of the system unit 12. Moving the actuator end 53 causes the hook end 55 to move from slightly below the floor of the docking bay 40 to above the floor of the docking bay 40. The finger lever 51 has a pivot axis between the actuator end 53 and the hook end 55.

The dimensions of the open end 48 are selected so that it fits within the opening in the front of the system unit 12 which was for a disk drive having a particular form factor. The docking bay 40 is dimensioned so that it fits within the bay in the system unit 12. Attached to the opposite side of the base 42 is a first printed circuit card 50. The first printed circuit card 50 includes a printed circuit card connector 52 located so that it attaches to the hard disk drive connector 30 on the interposer board 24 (shown in FIG. 3). The first printed circuit card 50 also includes the male portion 54 of a zero insertion force connector. The male portion 54 is elongated and terminates in a long string of connectors located within the housing 46 of the docking bay 40. The first printed circuit card 50 also includes circuit paths which electrically attach each pin of the connector 52 to an individual "pin" or conductor associated with the male portion 54 of the zero insertion force connector situated within the housing 46.

The first printed circuit card 50 also includes circuitry which allows a hard disk drive within the cartridge 60 to be "hot plugged" and circuitry which prevents any write operations to a hard disk drive within the cartridge before the computer system 10 has been rebooted. This last bit of circuitry prevents data loss from mistakenly writing to sectors on the hard disk drive which were free on the hard disk previously in the docking bay but which are not free on the hard disk drive currently in the docking bay. Each of these circuits is implemented using devices known as programmable logic arrays (not shown). The programmable logic arrays are an array of logic elements whose interconnections are programmed either by use of a mask or by using a special instrument in the field for making the interconnections. The programmable logic arrays are used to produce a set of logical outputs given certain inputs which can be represented by the timing diagram shown in FIG. 7 and the state diagram shown in FIG. 8. These will be discussed in further detail after the cartridge has been described in detail.

Now turning to FIGS. 3, 5a, 5b, 6a, 6b and 6c, the cartridge will be discussed. The cartridge 60 is a container which fits within the docking bay 40. The cartridge 60 contains a hard disk drive 62 which has a smaller form factor than the form factor of the drive that is provided for in the system unit 12. For example, the bay in the system unit 12 will accommodate a disk drive with a 3½" form factor. The docking bay 40 fits within the 3½" form factor bay in the system unit 12. The hard disk drive within the cartridge is a 2½" form factor drive which is a drive having length approximately equal to the width of a 3½" form factor drive and having a width approximately equal to one half the length of the 3½" form factor drive. The height of the 2½" form factor drive is approximately one half the height of a 3½" form factor drive. The 2½" form factor drive has a volume which is one fourth the volume of the 3½" form factor drive.

The cartridge 60 has an small opening 61 dimensioned to receive the hook end 55 of the finger lever 51. The cartridge 60 also includes a second printed circuit card 64. The second printed circuit card 64 includes a connector 66 which connects the pins of the hard disk drive 62 to circuit paths on the second circuit card 64. Also attached to the circuit card 64 is a female portion 68 of a zero insertion force connector. The female portion 68 of the zero insertion force connector is attached to the second circuit card 64 and to the circuit paths on the circuit card 64. There is one electrical contact on the female portion 68 of the zero insertion force connector for each of the pins of the hard disk drive 62. The female portion 68 of the zero insertion force connector is positioned along one edge of the cartridge 60. The female portion 68 of the zero insertion force connector used acts like a clamp and pinches the male portion 54 of the zero insertion force connector so that electrical contact is made. A small handle 70 accessible from the outside of the cartridge 60 is turned to connect or clamp the female portion of the zero insertion force connector onto the male portion 54 of the zero insertion force connector. The female portion 70 can also be unclamped by turning the handle 70. Advantageously, the zero insertion force connector selected is rated for a high number of cycles, such as 5000 cycles, to allow the cartridge 60 to be placed in and out of the docking bay 40 many times. The zero insertion force connector used here is available as Part Number 531414-4 from A M P INC of Harrisburg, Pa. The zero insertion force connector has both a female portion 68 and a male portion 54. The high cycle life allows a cartridge and docking bay to be connected repeatedly over a number of years.

The hard disk drive 62 is mounted within the cartridge 60 in the space left after accommodating the female portion 68 of the zero insertion force connector. The second circuit card is mounted on the top surface inside the cartridge 60. The cartridge is sized to fit within the opening in the front of the system unit 12 and within the docking bay 40. The only other electronics on the second circuit board 64 are termination resistors and power indicator LEDs which are well known in the electronics art and will not be discussed further.

In operation, the cartridge 60 is inserted within the docking bay 40. The female portion 68 of the zero insertion force connector in the cartridge is placed over the end of the male portion 54 in the docking bay 40 and guides the cartridge 60 into the docking bay 40. The cartridge 60 is pushed into the docking bay 40 until it abuts the spring plate 47. The cartridge 60 is pushed against the spring plate 47 until the hook end 55 of the finger lever 51 engages the opening 61 in the cartridge 60. The cartridge 60 is then "let go" whereupon the spring plate 47 biases the cartridge 60 to a position where the end of the opening 61 abuts the end of the hook end 55 of finger lever 51. At this position, the pins of the male portion 54 and the female portion 68 of the zero insertion force connectors are aligned. Advantageously, the cartridge is held in place by the finger lever 51 and the spring plate 47 which prevents any side loading on the zero insertion force connector. The next step is to turn handle 70 and engage the female portion 68 with the male portion 54 of the zero insertion force connector. To remove the cartridge 60 the handle 70 is turned to disengage the female portion 68 from the male portion 54 of the zero insertion force connecter. The finger lever 51 is then actuated by lifting it slightly upward. This removes the hook end 55 from the opening 61 in the cartridge 60. The spring plate 47 urges the cartridge 60 outward. The springs 49 are selected to eject the cartridge 60 slightly.

A power sequencing circuit included in the first printed circuit card 50 attached to the docking bay 40 allows "hot plugging" and a lockout feature for preventing unintentional overwriting of data.

Figure 7:
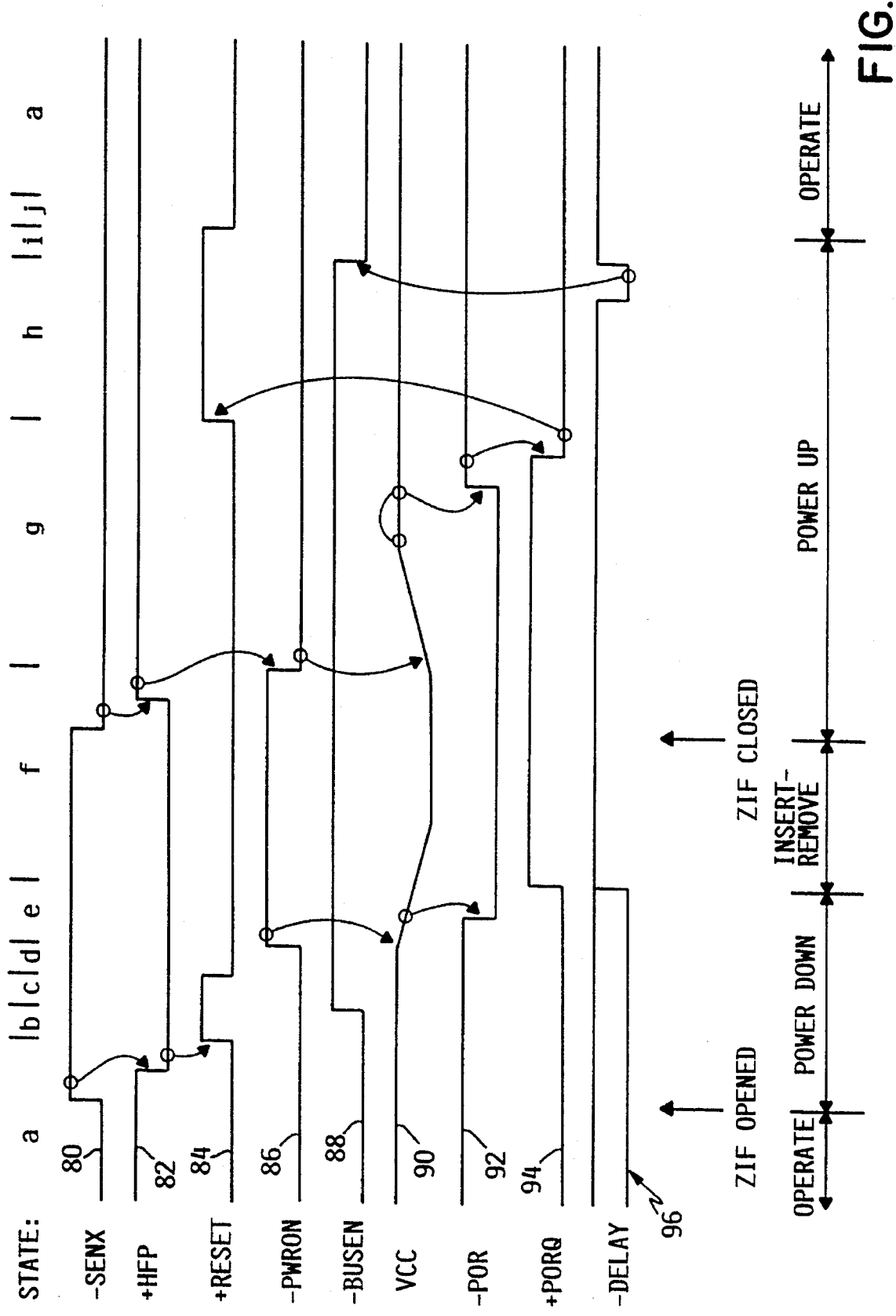
FIG. 7 shows the timing diagram for the circuitry which allows "hot plugging" of the hard disk drive.
Figure 8:
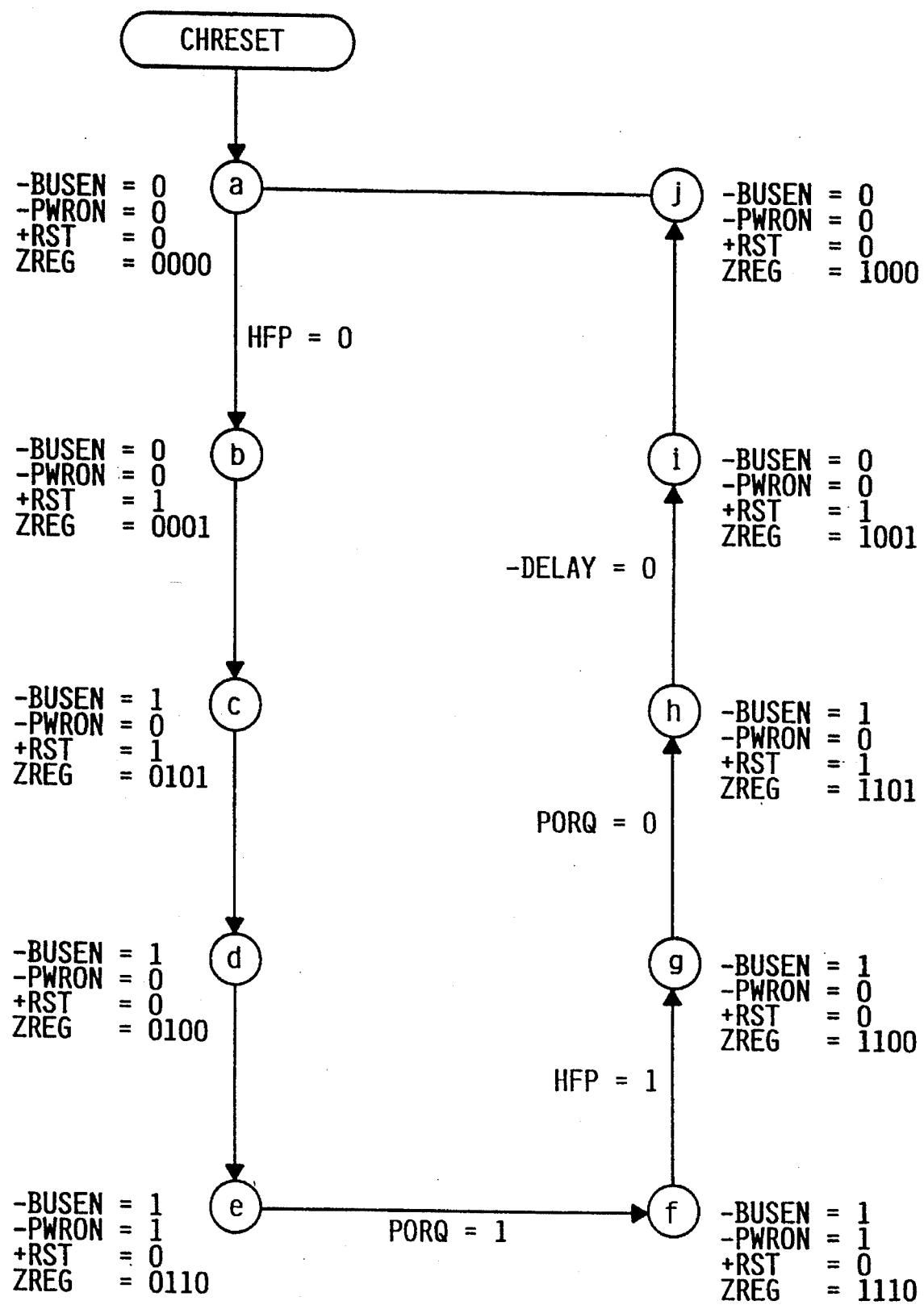
FIG. 8 is a state diagram which relates to the timing diagram shown in FIG. 7.

Now turning to FIGS. 7 and 8, the circuit on the first circuit card 50 which allows "hot plugging" will be discussed. FIG. 7 is a timing diagram and FIG. 8 is a state diagram which relates to the timing diagram of FIG. 7. As mentioned previously, the circuit is made using programmable logic arrays whose use are well known in the art. The sequence shown by the timing diagrams is the critical component of the circuits rather than the specific times between the various states. The overall sequence must be accomplished within a selected time. In the present invention it was noted that the female portion 68 of the zero insertion force connector is controlled by a bar (not shown) which distorts slightly within the elastic range of the material when the handle 70 is turned to engage or disengage the female portion 68 and the male portion 54. It was found that due to this distortion the electrical contact nearest the handle was made or broken slightly before all the other contacts were made or broken along the zero insertion force connector. The sequence to allow "hot plugging" occurs within this amount of time.

The timing diagram in FIG. 7 which reflects the power sequencing circuit, will now be generally described. The signal −SENX 80 is controlled by the pin of the female portion 68 of the zero insertion force connector which breaks first or makes contact first due to the distortion of the bar within the elastic range as mentioned in the previous paragraph. When the −SENX 80 signal changes it indicates a change in the connection between the female portion 68 and the male portion 54 and also indicates that power to the hard disk drive 62 will be turned off or turned on. To prevent damage to the hard disk drive 62 certain events must occur to assure that the hard disk drive 62 will not be damaged.

To prevent damage to the disk drive 62 when power is removed from the disk drive 62, ±5 volts must be maintained to the disk drive until after all the other electrical contacts are broken. The power sequencing circuit basically produces an accelerated the shutdown of the all the electrical contacts of the zero insertion force connector which correspond to the pins on the disk drive 62 before all the electrical contacts are physically broken as a result of turning the handle 70 to assure that the ±5 volts is the last to leave. In other words, the power sequencing circuit turns off all the connections to the hard disk drive before the last contact in the zero insertion force connector is broken. This occurs in less than 500 milliseconds which is approximately the time between when the first contact is broken and the last contact is broken along the zero insertion force connector.

To prevent damage to the disk drive 62 within a cartridge 60 during power up, each of the electrical contacts of the disk drive 62 must be brought up in a certain sequence. The ±5 volts must be connected and stabilized to the disk drive 62 before the sequence is started. The power sequence circuit senses when the first electrical contact is made, sequences all the pins in the disk drive 62 and assures that the ±5 volts has been connected to the disk drive 62 before the sequence is started. The power sequence circuit basically prevents electrical signals from passing to the disk drive 62 even though electrical contact may have been made along the contacts of the zero insertion force connector. A delay is used to accomplish this in the present invention.

FIG. 7 details how the power sequencing in this invention works. FIG. 7 is a timing diagram that can be implemented with programmable logic arrays which are well known in the art. Now looking at FIG. 7, when −SENX is low, electrical contact is made and when −SENX 80 goes high this indicates that electrical contact has been broken. When −SENX 80 goes high, the power down sequence starts. A signal +HFP 82, which is a signal indicating hard file presence is basically a slightly delayed reflection of the signal −SENX 80, goes from a high state to a low state in response to the signal −SENX 80 goes high. In response to +HFP going low, a signal + RESET 84 goes high for several clock cycles to acquiesce the hard disk drive 62 so that it does not send signals to the bus during a power shutdown or during a power startup. When the hard disk drive 62 is disengaged, a signal −PWRON 86, goes high. Also when the hard disk drive is disengaged a signal −BUSEN goes high indicating the bus has been disengaged or disabled. In response to the −PWRON 86 going high, a signal VCC 90, which is the dc voltage to the hard disk drive 62, begins to go low. In response to the VCC 90 signal beginning to go low, a signal −POR 92, which is the power on reset which is the sequencing procedure that the drive 62 must go through at a power down or at power up to prevent CMOS latchup, goes low. Upon removal of the cartridge 60, the power reset goes through its power down sequence. A signal +PORQ 94 is a slightly delayed reflection of the −POR 92 signal so that when −POR goes low, +PORQ goes high.

After a cartridge 60 is replaced or inserted into the docking bay 40 and the female portion 68 of the zero insertion force connector makes electrical contact with the male portion 54, the power up sequence begins. When the first female portion contacts the male portion, the signal −SENX 80 drops from high to low which causes the signal +HFP to go from low to high. The high state of +HFP causes the signal −PWRON 86 to go low indicating that power is available to the disk drive 62. The signal −PWRON 90 going low triggers the signal VCC 90 to begin rising which indicates that all the pins to the disk drive 62 are being placed at the proper power levels at the proper sequence. Once this proper power level at the proper sequence has been achieved, VCC is in its high state. VCC high causes signal −POR 92 to go high which in turn causes −PORQ 94 to go low. −PORQ 94 going low triggers the +RESET signal 84 to go high for a number of clock signals. Finally a delay line 96 goes low after a certain amount of time which indicates that the last pin on the zero insertion force connector already made electrical contact. In response to the delay line 96 going low, the −BUSEN signal 88 goes low which indicates the bus can now engage.

The state diagram shown in FIG. 8 merely shows the various states which the power sequencer circuit, does through. The states are also shown at the top of FIG. 7. FIG. 8 merely details the various states.

The power sequence circuit also provides a data integrity service for the user who has more than one removable cartridge 60 for use on a single personal computer system 10. The data integrity service is basically a lockout device which prevents a user from inserting a new cartridge 60 into the docking bay 40 and having critical portions written over with new information because the operating system does not realize a new cartridge has been inserted and writes to the new disk drive 62 as if it were the disk drive 62 previously in the docking bay 40.

This lock out circuitry is rather straight forward and it is felt a separate timing diagram and state diagram is not necessary to aid in the understanding of this portion of the invention. Therefore the feature will be described in writing. The power sequence circuit also monitors the presence or absence of a cartridge 60 through two signals −SENS1 and −SENS2 which could also be the two states of the signal −SENX in FIG. 7. Whenever the cartridge 60 is absent, a signal +FCHG, indicating a file change, is activated and remains active even after a new cartridge 60 has been inserted since it is latched by the power sequence circuit. The +FCHG signal remains active until a channel reset signal is activated which indicates that the computer system 10 has been rebooted either by turning off the on/off switch or by pressing the proper keys on the keyboard 16 to cause it to reboot. An LED can be activated when the +FCHG signal is active to indicate that the system must be rebooted before normal operations can resume.

The present invention and the best mode for practicing it has been described. It is to be understood that the foregoing description is illustrative only and that other means and techniques can be employed without departing from the full scope of the invention described in the appended claims.

What we claim is:

1. A removable hard disk drive system comprising:
   a docking bay which fits within a disk drive bay of a computer, said disk drive bay accommodating a drive, said docking bay having an opening therein with a height, width and depth dimension, said opening in the docking bay having an open end and a closed end, said closed end including a spring plate, a first portion of an electrical connector is positioned along the depth dimension of said opening;
   a cartridge which fits within the opening of the docking bay which includes a hard disk drive and a second portion of the electrical connector positioned along a depth dimension of the hard disk drive corresponding to the first portion of the electrical connector, the hard disk drive having dimensions which are less in height, width, and depth dimensions than the corresponding dimensions the disk drive bay, said spring plate contacting said cartridge and urging said cartridge toward said open end of said docking bay; and
   hot plugging means for allowing the removal of a first cartridge and the insertion of a second cartridge while power is maintained to the computer system, said hot plugging means operating over a time span between when a first contact is broken and the last contact is broken on the electrical connector as a coupling system is moved between a first position and a second position to break electrical contact and said hot plugging means operating over a time between when a first contact is made and the last contact is made on the electrical connector as the coupling system is moved between a second position and a first position to make electrical contact.

2. The removable hard disk drive system of claim 1 wherein said hot plugging means is provided by electrical devices on one of said first or second circuit cards.

3. The removable hard disk drive system of claim 1 wherein the electrical connector also serves to guide the cartridge into the opening of the docking bay.

4. The removable hard disk drive system of claim 1 wherein the disk drive bay has height, width and depth dimensions associated with a first form factor, the hard disk drive within the cartridge having the dimensions associated with a second form factor which are less in height, width, and depth than the corresponding dimensions of the first form factor.

5. The removable hard disk drive system of claim 1 wherein the coupling system electrically connects the first and the second portions of the electrical connector after the cartridge has been fully inserted into the opening of the docking bay.

6. The removable hard disk drive system of claim 1 wherein the coupling system includes means positioned on an external face of one of the docking bay or the cartridge for moving the coupling system between the first and the second position.

7. The removable hard disk drive system of claim 1 further comprising lockout means for preventing a write to the hard disk drive in a second cartridge after a first cartridge has been replaced by the second cartridge in the opening of the docking bay, said lockout means including indicator means for indicating a cartridge change after the first cartridge has been replaced with the second cartridge.

8. The removable hard disk drive system of claim 7 wherein said indicator means includes a light emitting diode (LED) which remains active until the computer system is rebooted and hard disk write operations can resume.

9. A computer system having a central processing unit capable of sending write commands to a hard disk drive, means for rebooting the computer system, and a removable hard disk drive system which fits within the computer system, said removable hard disk drive system comprising:
   a docking bay having a height, a width and a depth dimension,
   a cartridge having a height, a width and a depth dimension which fit within said docking bay, said cartridge containing a hard disk drive;
   a two part connector wherein one of said parts is electrically connected to and carried along the length of the depth dimension of the docking bay, and the other of said parts is electrically connected to and carried along the length of the depth dimension of the cartridge;
   a coupling system means for electrically connecting and disconnecting the parts of the two part connector;
   hot plugging means for allowing the removal of a first cartridge and the insertion of a second cartridge while power is maintained to the computer system, said hot plugging means operating over a time span between when a first contact is broken and the last contact is broken on the two part connector as the coupling system is moved between a first position and a second position to break electrical contact and said hot plugging means operating over a time between when a first contact is made and the last contact is made on the two part connector as the coupling system is moved between a second position and a first position to make electrical contact; and
   lockout means for preventing the central processing unit of the computer system from writing to the hard disk drive of the removable hard disk drive system after the cartridge has been removed from the docking bay during operation of the computer system, and before rebooting the computer system.

10. The computer system of claim 9 wherein the one and other parts of the two part connector are used to guide the cartridge into the docking bay before electrical connection is made.

11. The computer system of claim 9 further including handle means positioned on an external face of one of the docking bay or the cartridge for moving the coupling system between the first and the second position.

12. The computer system of claim 11 further including holding means for positioning and holding the cartridge within the docking bay independent of the handle means.

13. The computer system of claim 12 wherein said cartridge includes a recess and wherein said holding means includes a lever having an end which hooks into said recess in the cartridge.

14. The computer system of claim 13 further including means for ejecting the cartridge.

15. A method for removing a first disk drive from a computer system and replacing said first disk drive with a second disk drive, said computer system having an electrical connector for coupling one of the disk drives to the computer system, the electrical connector being located along a depth dimension in which the disk drives are inserted into the computer system, said computer system capable of sending write commands to a disk drive and capable of rebooting, said method comprising the steps of:

(a) removing the first disk drive from the computer while power is maintained to the computer;

(b) placing the second disk drive in the computer while power is maintained to the computer by completing an electrical connection of a first and a second portions of the electrical connector in a time span between when a first electrical contact and a last electrical contact is made between the first and the second portions of the electrical connector as the first and the second portions of the electrical connector are mechanically engaged while the second disk drive is placed in the computer; and (c) preventing the computer system from issuing write commands to the disk drive until after the second disk drive has been placed in the computer system and the computer system has rebooted.

* * * * *